United States Patent
Huang et al.

(10) Patent No.: US 9,237,105 B2
(45) Date of Patent: Jan. 12, 2016

(54) DATA COMMUNICATION WITH COMPENSATION FOR PACKET LOSS

(75) Inventors: Cheng Huang, Redmond, WA (US); Manish Jain, Malden, MA (US); Jin Li, Bellevue, WA (US); Amit Kumar Mondal, Evanston, IL (US); Aleksandar Kuzmanovic, Evanston, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 998 days.

(21) Appl. No.: 12/632,834

(22) Filed: Dec. 8, 2009

(65) Prior Publication Data

US 2011/0134909 A1    Jun. 9, 2011

(51) Int. Cl.
*H04L 12/801* (2013.01)
*H04L 1/00* (2006.01)
*H04L 1/08* (2006.01)
*H04L 12/853* (2013.01)
*H04L 12/825* (2013.01)
*H04L 12/811* (2013.01)

(52) U.S. Cl.
CPC .............. *H04L 47/14* (2013.01); *H04L 1/0009* (2013.01); *H04L 1/0018* (2013.01); *H04L 1/0057* (2013.01); *H04L 1/08* (2013.01); *H04L 47/2416* (2013.01); *H04L 47/26* (2013.01); *H04L 47/38* (2013.01); *H04L 2001/0097* (2013.01)

(58) Field of Classification Search
None
See application file for complete search history.

(56) References Cited

U.S. PATENT DOCUMENTS

| | | | | |
|---|---|---|---|---|
| 5,819,258 | A * | 10/1998 | Vaithyanathan et al. | 707/692 |
| 6,260,038 | B1 * | 7/2001 | Martin et al. | 1/1 |
| 6,748,220 | B1 * | 6/2004 | Chow et al. | 455/450 |
| 7,017,102 | B1 | 3/2006 | Kristensson et al. | |
| 7,133,934 | B1 * | 11/2006 | Rossello et al. | 709/249 |
| 7,155,538 | B1 * | 12/2006 | Rossello et al. | 709/249 |
| 7,167,451 | B1 | 1/2007 | Oran | |
| 7,263,107 | B1 * | 8/2007 | Johnston et al. | 370/467 |
| 7,307,983 | B1 * | 12/2007 | Chen | 370/352 |
| 7,388,835 | B1 * | 6/2008 | Chen | 370/235 |

(Continued)

OTHER PUBLICATIONS

Amir, et al. "1-800-Overlays: Using Overlay Networks to Improve VoIP Quality", Retrieved at<<http://www.cs.jhu.edu/~terzis/voip.pdf>>, NOSSDAV'05, Jun. 13-14, 2005, ACM, pp. 6.

(Continued)

*Primary Examiner* — Chirag Shah
*Assistant Examiner* — Suk Jin Kang
(74) *Attorney, Agent, or Firm* — Steve Wight; Sandy Swain; Micky Minhas (57) ABSTRACT

Described is a technology by which a relay is coupled (e.g., by a wire) to a network and (e.g., by a wireless link) to an endpoint. Incoming data packets directed towards the endpoint are processed by the relay according to an error correction scheme, such as one that replicates packets. The reprocessed packets, which in general are more robust against packet loss, are then sent to the endpoint. For outgoing data packets received from the endpoint, the relay reprocesses the outgoing packets based upon the error correction scheme, such as to remove redundant packets before transmitting them to the network over the wire. Also described are various error correction schemes, and various types of computing devices that may be used as relays. The relay may be built into the network infrastructure, and/or a directory service may be employed to automatically find a suitable relay node for an endpoint device.

20 Claims, 4 Drawing Sheets

(56) References Cited

U.S. PATENT DOCUMENTS

| | | | |
|---|---|---|---|
| 7,593,321 B2* | 9/2009 | Galand et al. | 370/218 |
| 7,839,858 B2* | 11/2010 | Wiemann et al. | 370/394 |
| 2002/0087666 A1* | 7/2002 | Huffman et al. | 709/220 |
| 2003/0074369 A1* | 4/2003 | Schuetze et al. | 707/103 R |
| 2003/0123466 A1* | 7/2003 | Somekh et al. | 370/401 |
| 2004/0042402 A1* | 3/2004 | Galand et al. | 370/237 |
| 2005/0015511 A1* | 1/2005 | Izmailov et al. | 709/238 |
| 2005/0038650 A1* | 2/2005 | Bellegarda et al. | 704/231 |
| 2006/0251011 A1* | 11/2006 | Ramakrishnan et al. | 370/328 |
| 2007/0016344 A1 | 1/2007 | Stefani | |
| 2007/0033494 A1* | 2/2007 | Wenger et al. | 714/776 |
| 2007/0133515 A1 | 6/2007 | Kumar et al. | |
| 2007/0136256 A1* | 6/2007 | Kapur et al. | 707/3 |
| 2007/0147314 A1* | 6/2007 | Taleb et al. | 370/338 |
| 2008/0244148 A1 | 10/2008 | Nix, Jr. et al. | |
| 2008/0317017 A1* | 12/2008 | Wiemann et al. | 370/389 |
| 2009/0003378 A1* | 1/2009 | Sachs | 370/466 |
| 2009/0063928 A1* | 3/2009 | Gondo et al. | 714/752 |
| 2009/0192981 A1* | 7/2009 | Papaemmanouil et al. | 707/2 |
| 2010/0098045 A1* | 4/2010 | Miyazaki | 370/342 |
| 2010/0271999 A1* | 10/2010 | Yu et al. | 370/312 |
| 2011/0038376 A1* | 2/2011 | Wiemann et al. | 370/394 |

OTHER PUBLICATIONS

Amir, et al. "An Overlay Architecture for High-Quality VoIP Streams", Retrieved at<<http://ieeexplore.ieee.org/stamp/stamp.jsp?arnumber=04014204>>, IEEE Transactions on Multimedia, vol. 8, No. 6, Dec. 2006, pp. 1250-1262.

Rubino, et al. "Evaluating the Utility of Media-Dependent FEC in VoIP Flows ", Retrieved at<<http://www.springerlink.com/content/440xr7hj1878600/fulltext.pdf>>, 2004, pp. 31-43.

Biu, et al. "On the TCP-Friendliness of VoIP Traffic ", Retrieved at<<http://ieeexplore.ieee.org/stamp/stamp.jsp?arnumber=04146898>>, 2006 IEEE, pp. 12.

"VoIP Services and Subscribers: Annual Market Share and Forecasts ", Retrieved at<<http://translate.google.com/translate?hl=en&sl=ja&u=http://www.dri.co.jp/auto/report/infonetics/infovoipss08.htm&prev=/search%3Fq%3D%2522Annual%2BMarket%2BShare%2Band%2BForecasts%2522%26hl%3Den%26safe%3Dactive%26num%3D20>>, pp. 3.

Vasudevan, et al. "A First Look at Media Conferencing Traffic in the Global Enterprise ", Retrieved at<<http://research.microsoft.com/pubs/81361/54480120.pdf>>, LNCS 5448, pp. 120-129.

Cole, et al. "Voice over IP Performance Monitoring ", Retrieved at<<http://delivery.acm.org/10.1145/510000/505669/p9-cole.pdf?key1=505669&key2=3726377421&coll=GUIDE&dl=GUIDE&CFID=44412814&CFTOKEN=44321770>>, ACM SIGCOMM, pp. 9-24.

Chen, et al. "Quantifying Skype User Satisfaction ", Retrieved at<<http://nslab.ee.ntu.edu.tw/publication/conf/chen06_skype.pdf>>, SIGCOMM'06, Sep. 11-15, 2006, pp. 399-410.

Huang, et al. "An Embedded Packet Train and Adaptive FEC Scheme for VoIP over Wired/Wireless IP Networks ", Retrieved at<<http://ieeexplore.ieee.org/stamp/stamp.jsp?tp=&isnumber=34761&arnumber=1661304>>, ICASSP 2006, IEEE, pp. 429-432.

Baset, et al. "An Analysis of the Skype Peer-to-Peer Internet Telephony Protocol ", Retrieved at<<http://www1.cs.columbia.edu/~salman/publications/skype1_4.pdf>>, pp. 11.

Guha, et al. "An Experimental Study of the Skype Peer-to-Peer VoIP System ", Retrieved at<<http://iptps06.cs.ucsb.edu/papers/Guha-skype06.pdf>>, pp. 6.

Dube, et al. "Utility Analysis of Simple FEC Schemes for VoIP ", Retrieved at <<http://www.springerlink.com/content/440xr7hj1878600/fulltext.pdf>>, NETWORKING 2002, pp. 226-239.

Sengupta, et al. "Improving R-Score of VoIP Streams over WiMax ", Retrieved at<<http://ieeexplore.ieee.org/stamp/stamp.jsp?tp=&isnumber=4024164&arnumber=4024237>>, IEEE, 2006, pp. 866-871.

Amir, et al. "An Overlay Architecture for High-Quality VoIP Streams ", Retrieved at <<http://www.cs.jhu.edu/~terzis/voip-tmm.pdf>>, pp. 13.

Verkaik, et al. "Softspeak: Making VoIP Play Well in Existing 802.11 Deployments ", Retrieved at<<http://cseweb.ucsd.edu/~snoeren/papers/ss-nsdi09.pdf>>, pp. 14.

Chiang, et al. "A Performance Study of VoIP Applications: MSN vs. Skype ", Retrieved at<<http://multicomm.polito.it/proc_multicomm06_3.pdf>>, In the proceedings of MULTICOMM 2006, pp. 13-18.

Bolot, et al. "Adaptive FEC-based Error Control for Internet Telephony ", Retrieved at<<http://www-inst.eecs.berkeley.edu/~ee290t/sp04/lectures/audio_net_no10.pdf>>, 1999 IEEE, pp. 1453-1460.

Andersen, et al. "Resilient Overlay Networks ", Retrieved at<<http://nms.lcs.mit.edu/papers/ron-sosp2001.pdf>>, 18th ACM Symp. on Operating Systems Principles (SOSP) Oct. 2001, ACM, pp. 15.

Subramanian, et al. "OverQoS: An Overlay Based Architecture for Enhancing Internet QoS ", Retrieved at<<http://cs.nyu.edu/~lakshmi/overqos.pdf>>, pp. 14.

Rajendran, et al. "Performance Optimization of VoIP Using an Overlay Network ", Retrieved at<<www.ee.columbia.edu/~kumar/papers/infocom06.ps>>, pp. 12.

Kawata, et al. "Using Dynamic PCF to Improve the Capacity for VoIP Traffic in IEEE 802.11 Networks ", Retrieved at<<http://www1.cs.columbia.edu/~ss2020/papers/dpcf_wcnc.pdf>>, pp. 7.

Liang, et al. "Multi-Stream Voice over IP using Packet Path Diversity ", Retrieved at<<http://www.stanford.edu/~bgirod/pdfs/mmsp.pdf>>, pp. 6.

Tao, et al. "Improving VoIP Quality through Path Switching ", Retrieved at<<http://www.dtc.umn.edu/publications/reports/2005_52.pdf>>, pp. 12.

Ng, et al. "Predicting Internet Network Distance with Coordinates-Based Approaches ", Retrieved at<<http://www.cs.rice.edu/~eugeneng/papers/INFOCOM02.pdf>>, pp. 10.

Dabek, et al. "Vivaldi: A Decentralized Network Coordinate System ", Retrieved at<<http://pdos.csail.mit.edu/papers/vivaldi:sigcomm/paper.pdf>>, SIGCOMM'04, Aug. 30-Sep. 3, 2004, pp. 12.

Kim, et al. "Floodless in SEATTLE: A Scalable Ethernet Architecture for Large Enterprises ", Retrieved at<<http://www.cs.princeton.edu/~chkim/Research/SEATTLE/seattle.pdf>>, pp. 1-14.

Perkins, et al. "A Survey of Packet Loss Recovery Techniques for Streaming Audio ", Retrieved at<<http://www-inst.eecs.berkeley.edu/~ee290t/sp04/lectures/packet_loss_recov_paper11.pdf>>, Sep./Oct. 1998, pp. 40-48.

* cited by examiner

DATA COMMUNICATION WITH COMPENSATION FOR PACKET LOSS

BACKGROUND

Various types of data communication over the Internet are becoming commonplace. For example, people and enterprises are choosing to use voice over Internet protocol (VoIP) technology as an inexpensive way to communicate by voice instead of making a conventional telephone call. Videoconferencing applications are similarly being used for sending and receiving video over the Internet.

However, lost packets present a problem with data communication, particularly in such applications where latency is a concern. Such packets may be lost as a result of pure loss, in which a packet itself is lost, or effective loss, in which a packet is either lost or experiences excessive jitter (e.g. more than a length of a typical de-jitter buffer, such as 100 ms or more). For example, in VoIP applications, lost packets result in unnatural sounding speech or broken speech.

A significant amount of packet loss occurs in wireless networking, because of its generally lower capacity and fluctuating available bandwidth, and as a result of random packet losses due to varying signal strength, interference and so forth. Another source of significant amount of packet loss may occur at a network bottleneck, e.g., at a router in an enterprise branch office. Latency-sensitive applications such as VoIP applications and videoconferencing thus often experience significant degradation in quality of service when used in such networks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a relay is coupled (e.g., by a wire) to a network and (e.g., by a wireless link) to an endpoint. When the relay receives incoming data packets directed towards the endpoint, a packet processing mechanism of the relay processes the incoming data packets based upon an error correction scheme into reprocessed incoming packets and transmits the reprocessed incoming packets to the endpoint. When the relay receives outgoing data packets from the endpoint, the packet processing mechanism processes the outgoing data packets based upon the error correction scheme into reprocessed outgoing packets before transmitting the reprocessed outgoing packets to the network.

In one aspect, various error correction schemes may be used. For example, replication is one error correction scheme. For incoming data, the relay replicates packets and sends them over various time slices to the endpoint. For outgoing data, the relay may remove redundant packets that were received as a result of a replication scheme used in the endpoint-to-relay communications. In another aspect, a general forward error correction coding scheme can be used.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using error correction (e.g., a Reed-Solomon based error correction scheme or replicating packets) when communicating data via a relay to and from a client endpoint (e.g., a wireless device) to improve data communication quality. Also described is a relay solution that reprocesses the packets (e.g., removes any replicated packets) before transmission over a wired connection. While some of the examples herein are directed towards wireless voice communication (e.g., VoIP over Wi-Fi), it is understood that these are only examples, and that other applications, including latency-sensitive applications, may benefit from the packet replication technology described herein. For example, video applications, search applications, applications that deal with large and/or fast data transmissions (e.g., interactive maps) and so forth significantly benefit from not having lost or delayed packets. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data communication in general.

Figure 1:
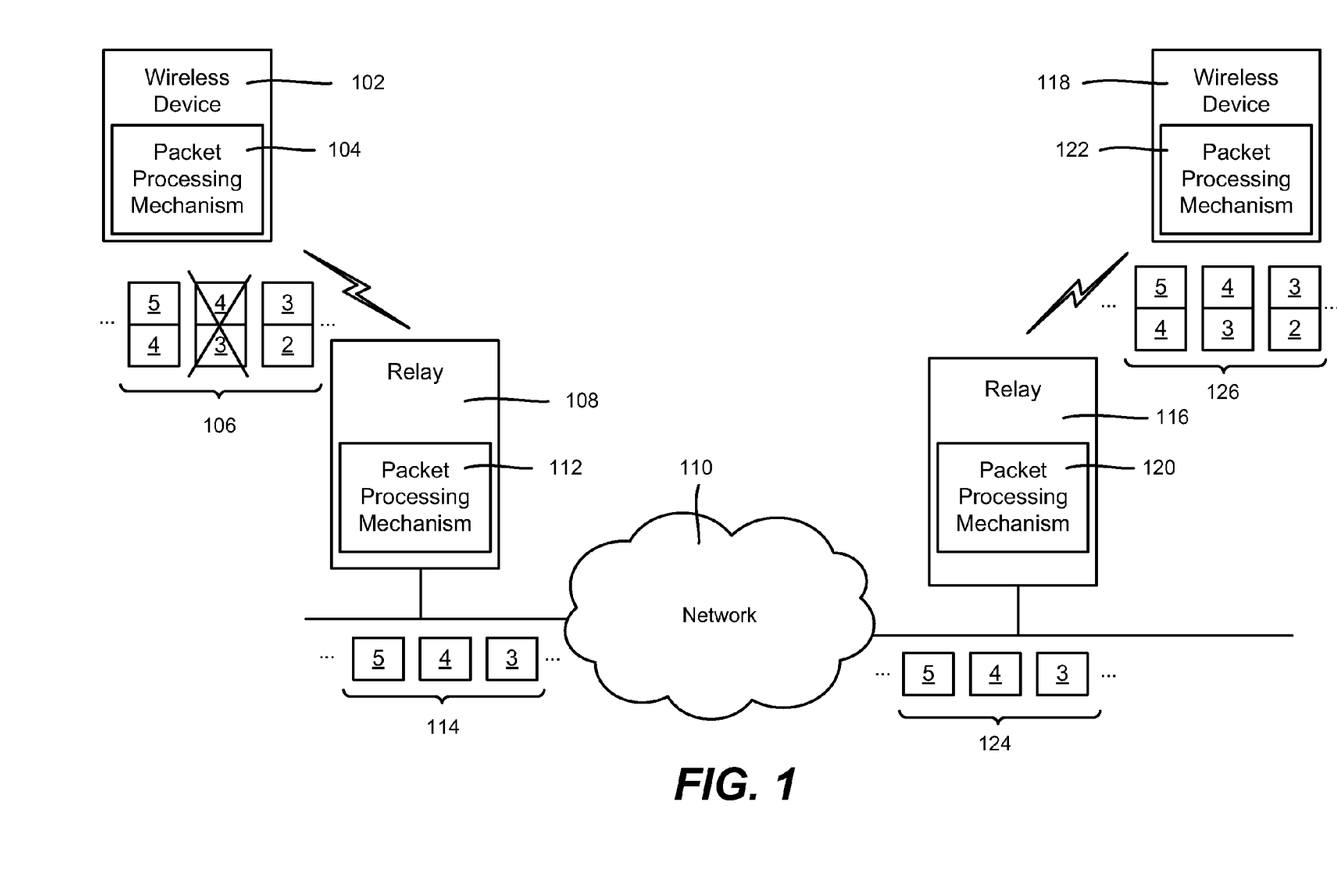
FIG. 1 is a block diagram showing example components for implementing an error correction scheme to compensate for any lost packets on one link and to send and receive packets over another link to a network.

FIG. 1 shows various aspects related to the packet replication and removal technology described herein. A wireless device 102 (endpoint) that is sending data packets includes a packet processing mechanism 104 (e.g., software or other logic) that processes packet data to be sent according to a suitable error correction scheme, as represented by the numbered packets 106. For example, for VoIP, the packet processing mechanism 104 replicates the packet data 106 according to a suitable replication scheme. For video conferencing applications, the packet processing mechanism 104 may use a general Reed-Solomon based forward error correcting scheme. Examples of such endpoints include personal computers connected by Wi-Fi such as laptops, handheld devices (e.g., cellular telephones) that are configured for Wi-Fi communication, and so forth.

The numbers within the packets 106 indicate the different pieces of data that have to be received to provide a complete set of data. As described below, in one implementation each of these pieces comprises its own packet, and thus FIG. 1 shows the packets 106 being grouped by time slots, e.g., packets (data pieces) 5 and 4 are in one time slot, packets 4 and 3 in another, and so on. However, it is also feasible to combine multiple pieces of data and used the combined data as the payload of a single packet, such as appending different pieces of data into a single payload, or using other forward error (e.g., XOR-based or Reed-Solomon based) correction schemes.

In the scheme exemplified in FIG. 1, the packets are replicated once each. Thus, if the packets 3 and 4 in their respective time slot are lost, (as represented by the crossed lines over them "X-ing" them out), the relay 108 still receives all data pieces 2-5 because packets 3 and 4 were also sent in other time slots.

Depending on the type of data being replicated, heavier replication schemes and/or other error correction schemes may be used. For example, one implementation replicated each of the data packets five times for VoIP data. This provided a significant improvement over replicating the data twice, and an even larger improvement compared to sending data with no replication, where no loss can be recovered. Replication thus is very effective in recovering from long burst losses commonly observed in the wireless medium; (remaining losses often may be concealed using signal processing techniques). Also, due to the Wi-Fi packet structure on the air, heavy replication on Wi-Fi link incurs less overhead compared with similar replication on the wired network. For example, five times replication on a 802.11b network only incurs an overhead of fifty percent when all Wi-Fi overhead is considered.

Note that because of the small size of VoIP payload, along with the inherent overhead of Wi-Fi links, such heavy replication does not incur large overhead that consumes Wi-Fi airtime. More particularly, for VoIP traffic, the bit-rate is relatively low and individual packets are relatively small. Typically, an audio codec generates one packet every 20 ms, i.e., a frame rate of 50 fps. Assuming a typical fixed de-jitter buffer size of 100 ms, there can be at most five packets in the de-jitter buffer. Therefore, transmitting VoIP data need not encode across packets, but rather may replicate each data packet. In such a scheme, each audio packet is sent out r times (referred as replication ratio). When an audio packet is generated, it is sent out together with r−1 future data packets, separated by d packets (where d is referred to as replication distance). For example, if r=3 and d=2, then packet i is sent out three times, namely when it is first generated, together with packet i+2, as well as with packet i+4. Note that FIG. 1 represents a replication scheme of r=2 and d=1.

Figure 2:
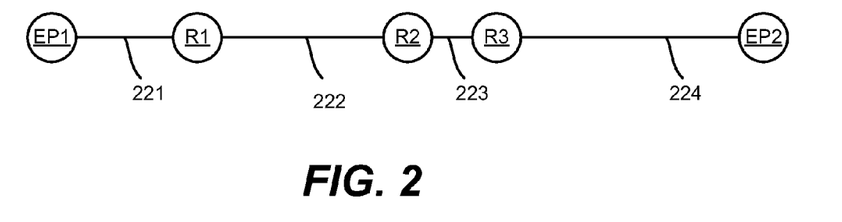
FIG. 2 is a representation of a number of different segments between endpoints in an example network.

The replicated packets 106 are received at a wired node, shown in FIG. 1 as a relay 108, such as an access point or a computer system, which couples the wireless device 102 to a network link such as an inter-branch long haul link of an enterprise network or the Internet 110. In the implementation shown in FIG. 1, the relay 108 similarly includes a packet processing mechanism 112, which in this example operates to remove any redundant data pieces/packets and thus avoid wasteful overhead on long haul wired links, where packet loss is relatively rare. This eases the load on the network 110, which helps avoid congestion-induced delay. In FIG. 2, the packets labeled 114 represent the packets after redundancy removal (note that data packet 2 has already been sent).

Note that the receiving endpoint may or may not be configured to replicate packets and/or remove replicated packets.

For example, if the receiving endpoint is VoIP telephone attached to a wired personal computer, then Wi-Fi is not involved, and replication to overcome Wi-Fi communication is not an issue; (note however that any packet-based wireless communication such as to a cordless telephone may similarly benefit from replication). Also, the recipient may be using wireless communication that does not have a data replication and removal scheme in place, in which event packet loss may still present problems within the recipient's environment, but generally not because of packet loss problems at the sender's endpoint where packet loss was eliminated (or significantly reduced) via replication.

However, in the example of FIG. 1, in which the relay 116 and the wireless device 118 are each configured with a packet processing mechanism (120 and 122, respectively), the relay 116 restores replication before forwarding packets to the wireless device 118. This is represented in FIG. 1 by the received packets 124 being processed into another set of replicated packets 126. As can be readily appreciated, the sender and receiver endpoints may reverse their roles using replication in the same manner, e.g., the wireless device 118 may send data to the wireless device 102 via replication, removal, and re-replication at the other end.

Note that the error correction schemes need not be the same at each endpoint. For example, one endpoint may use a heavier replication scheme (e.g., five replications per data piece) while the other uses a less heavy one (e.g., three replications per data piece). Indeed, such schemes may be adaptive, such as to use heavier replication when interference is detected and/or Wi-Fi airtime is plentiful.

Moreover, such relays configured with error correction processing need not only be wireless-to-wired nodes. For example, a relay that communicates packets wirelessly to another relay need not remove packets so that the next wireless link also benefits from redundancy. However, a different/more appropriate error scheme may be used, such as to use heavier replication to the wireless endpoint device and less heavy replication to the other relay, and so on.

Indeed, more generally as represented in FIG. 2, any segment 221-224 in the multi-hop configuration between endpoints EP1 and EP2, whether wired or wireless, may benefit from replication/removal as long as the relays R1-R3 are appropriately configured to handle replication and/or removal with each other (and with an endpoint when appropriate). Propagation delay, jitter and/or packet loss characteristics may be evaluated for each segment/link to implement an appropriate scheme for that particular segment. The evaluation may be dynamic (e.g., regularly performed) and/or predicted based upon historical observations such that the schemes may be adaptively varied, such as while conditions change throughout the day, to use different schemes on weekdays versus weekends, and so forth.

In this manner, replication and other forward error correction schemes may be used to improve quality of service. These schemes may be determined based on the characteristics of various links/segments in the network, and may possibly be adaptive to current characteristics.

Another scheme that may be used to improve quality of service is referred to herein as intelligent reference, in which the receiver provides information corresponding to lost packets back to the sender, who can then take corrective action to the extent possible.

Figure 3:
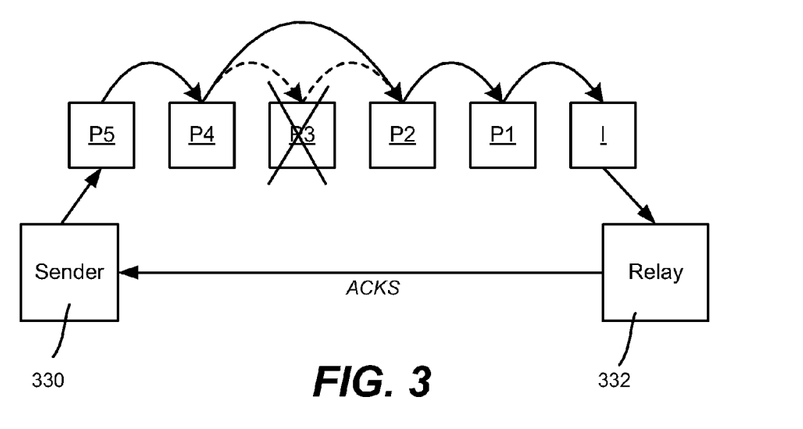
FIG. 3 is a representation of how reference data returned to a sender in one error correction scheme can be used to compensate for a lost packet.

By way of example, consider video coding, in which I-frames are sent, followed by P-frames that in general contain change information relative to the previous frame. This is generally represented in FIG. 3, where the sender 330 sends an I-frame I and a sequence of P-frames P1-P5 (e.g., as packets). The relay 332 sends an ACK (acknowledgement) as each packet is received, which thus corresponds to reference information about which packets were not received.

In the example of FIG. 3, the frame P3 is lost and thus not acknowledged as being received by the relay 332. When the sender 330 recognizes this, it is too late to re-send the packet containing the P-frame numbered P3. However, instead of coding the P-frame numbered P4 based upon the changes relative to the P-frame numbered P3, the sender 330 can instead code the P-frame numbered P4 based upon the P-frame numbered P2. This will still likely be noticed as a glitch when the frame based on P4 is shown, however the glitch likely will be shorter and less severe. Also, the receiver may decide to simply hide P3, thus avoid the showing of the glitched frame at the receiver. Further, if enough P-frame packets are lost, the sender can start over with a new I-frame.

Turning to another aspect, FIGS. 1 and 2 may be based upon the use of a dedicated relay infrastructure. For example, the relay functionality may be implemented in a wireless access point that is configured to perform application-specific processing on the data being sent and received. However, this is associated with an expense, namely reconfiguring or replacing existing relays (access points) in a network.

Figure 4:
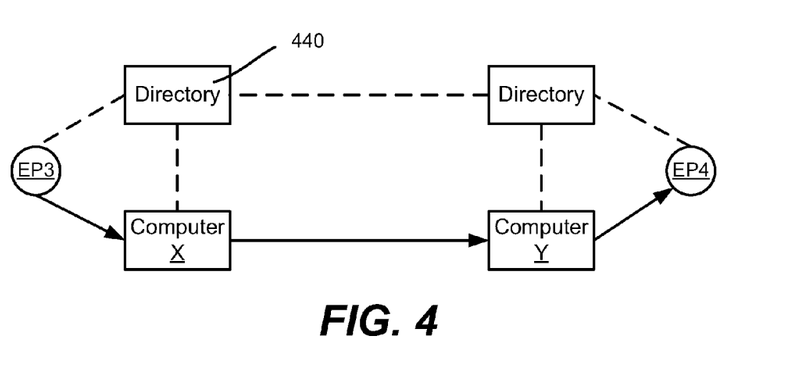
FIG. 4 is a representation of how an endpoint can locate and communicate through a relay in the form of a computer system or other suitable computing device.

An alternative approach is to use existing wired endpoints such as wired VoIP devices or computer systems as the relay nodes. For example, as represented in FIG. 4, a wireless VoIP endpoint EP3 may want to call VoIP endpoint EP4. Instead of calling the endpoint EP4, the endpoint EP3 consults a directory 440 with which it is registered that instructs it to call nearby computer X. The endpoint EP3 and computer X can then set up the forward error correction scheme (e.g., replication or other forward error correction mechanism) as desired based on the application and their respective capabilities, which in this example is directed towards sending VoIP data.

The computer may then place the call over the wired line, removing or otherwise processing the packets as desired to remove redundancy. However, in this example, the directory 440 instructs the computer X to call another computer, computer Y, to reach the endpoint EP4, (e.g., according to registering EP4 in the same or another consulted directory). Again, EP4 and computer Y can then communicate using whatever forward error correction scheme is appropriate for their communication (which may be none, for example if EP4 is hard-wired to computer Y). The wired endpoints can similarly implement replication or the like to communicate received packets back to their respective wireless VoIP endpoint.

In order to operate, the wireless endpoint needs to locate a nearby wired peer or computer system to serve as its relay. One option is to use an IP geo-location database, which provides detailed location information (such as country, state, city, and even a building number) about each IP address. When a wireless endpoint initiates a VoIP communication, the initiator finds a nearby wired peer or computer system using the database, and instructs the endpoint so as to use it as a relay.

However, maintaining an accurate and up-to-date geo-location database is a nontrivial task. Thus, one alternative is to adopt a network coordinate-based approach, whereby each endpoint determines its coordinates when signing into the VoIP network. Either a centralized or a distributed approach can be used. For example, a master server or the like can use these coordinates to estimate the distance (in terms of latency) between any two active endpoints in the system. Wired peers or computer systems with close to zero distance are desirable as relays.

Similar to a centralized network coordinate scheme, a list of landmarks in the enterprise network may be identified, such as stable servers or router interfaces in different geographic locations. Whenever an endpoint signs in, it pings each landmark a number of times, and reports the minimum latency to each landmark. This way, each endpoint generates a latency vector, comprising minimum latency measures to the pinged landmarks. The end point may then send the latency vector to a master, which may then use a Cosine similarity value between two such vectors as a measure of their closeness. As is known, cosine similarity is a simple measure of how similar two vectors are based upon their angular relationship. For two vectors $v_i$ and $v_j$, each of length L, it is defined as:

$$\cos\_sim(v_i, v_j) = \frac{\sum_{l \leq L} (v_{i,l} \times v_{j,l})}{\sqrt{\sum_{l \leq L} v_{i,l}^2 \times \sum_{l \leq L} v_{j,l}^2}}$$

Vectors that are close approach a similarity value of one, while the more different the vectors are, the further the similarity value moves towards zero. Note that there is no guarantee that the endpoints are at the same location, even if their latency vectors are identical, however the probability of this is very low.

Using a latency vector measured against the landmarks can effectively pin down the region of an endpoint, whereby a master can suggest other wired endpoints in the same region as potential relays. The endpoint may then ping each of these suggested relays individually to evaluate which one is truly nearby, and thus best suited as a relay.

Figure 5:
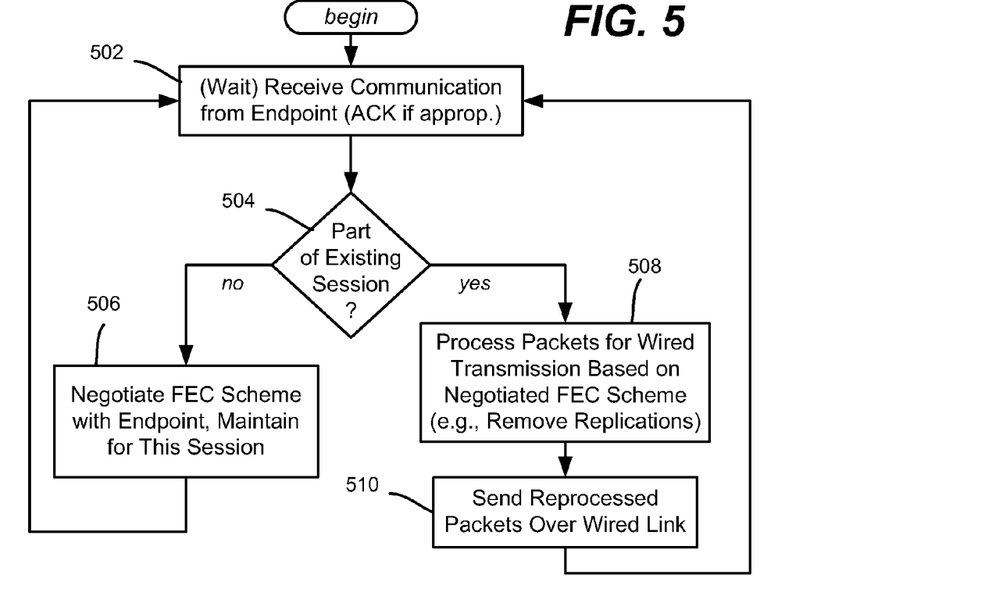
FIG. 5 is a flow diagram showing example steps that may be taken by a relay to handle outgoing communications received from an endpoint when the data packets of the communications are received in accordance with an error correction scheme.

FIG. 5 is a flow diagram showing example steps that a relay may implement in handling a communication received from an endpoint (step 502). This may be after a wait time. Note that step 502 also may acknowledge receipt of the communication if appropriate.

At step 504, the relay may analyze the communication (e.g., the packet header) to determine whether this communication is part of an existing session. If not, then step 506 is executed to negotiate the type of error correction that is to be used with the endpoint's data packets. For example, replication may be used, with the r and d parameters set by the endpoint according to the network performance observed in the particular network segment in the past. Alternatively, another forward error correction (FEC) scheme may be used, or intelligent referencing (as in the video frame data described above) may be used as the error correction scheme. Note that such negotiation may be performed in advance, such as with a device that can only handle VoIP data, however negotiating per session/application where appropriate provides flexibility and extensibility, as the same device may use one scheme for one application and/or session, another scheme for another application and/or session, different versions, and so on. In this example, packet replication is exemplified as the forward error correction described hereinafter.

Further, note that such negotiation allows for adaptive error correction schemes. This includes renegotiating the scheme during a session, if necessary. While not explicitly shown in FIG. 5 (or FIG. 6 described below), renegotiation during a session and/or ending and starting a new session to force a new negotiation are implicit steps that may be taken as options to provide for adaptive schemes.

Once the forward error correction scheme in use is known, step 504 branches to step 508 where the packets may be accordingly processed for transmitting over the wire. In this example, redundant packets are removed at step 508, and then the remaining packets are transmitted at step 510. In a forward error correction scheme where packets are rebuilt from the contents of another packet (e.g., lost packet 2 is rebuilt from packet 1 and packet 1 XOR-ed with packet 2), the reprocessing at step 508 may rebuild packet 2 before transmission.

Figure 6:
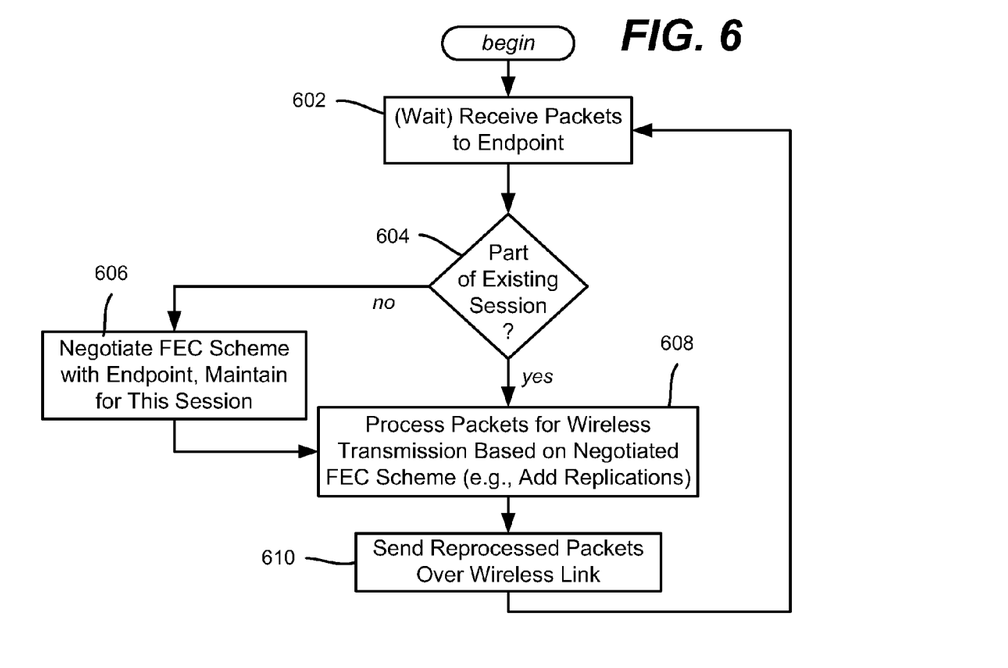
FIG. 6 is a flow diagram showing example steps that may be taken by a relay to handle incoming communications directed towards an endpoint, including processing the data packets in accordance with an error correction scheme before sending them to the endpoint.

FIG. 6 represents example steps the relay may perform when receiving packets directed towards an endpoint (step 602). If not part of an existing session as evaluated at step 604, then the error correction scheme may be negotiated as represented by step 606 (if not already pre-negotiated).

The received packets are then processed according to the error correction scheme in use at step 608. For example, the relay may add replications before sending to the endpoint at step 610, to reduce the chances of packet loss.

Exemplary Operating Environment

Figure 7:
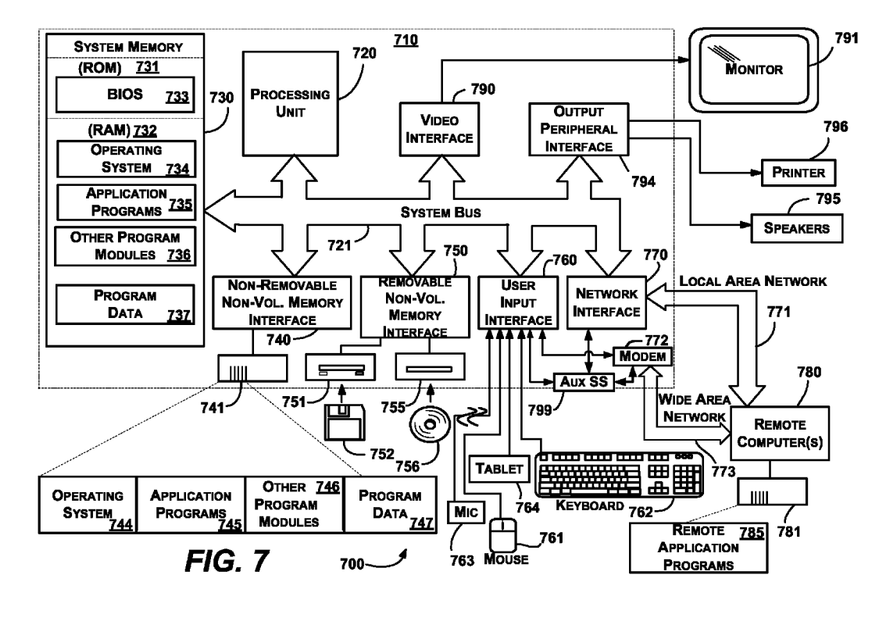
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system for communicating using VoIP technology, the system comprising:
a first VoIP endpoint, a second VoIP endpoint, and a third VoIP endpoint, each VoIP endpoint having a microphone and a speaker and capable of inputting voice via the microphone and outputting voice via the speaker wherein
the first VoIP endpoint that has a wireless link to a network and that, when a VoIP communication is initiated to communicate with the second VoIP endpoint:
identifies the third VoIP endpoint to serve as a relay, the third VoIP endpoint having a wired connection to a long-haul link of the network;
creates data packets and replicated data packets of the VoIP communication; and
transmits via the wireless link for delivery to the third VoIP endpoint the data packets and replicated data packets; and
the third VoIP endpoint that, when the data packets and replicated data packets are received from the first VoIP endpoint: relays the data packets to the second VoIP endpoint by:
performing error correcting using the replicated data packets; and
transmitting via the long-haul link the data packets without the replicated data packets for delivery to the second VoIP endpoint.

2. The system of claim 1 wherein the third VoIP endpoint is identified based on distance between the first VoIP endpoint and the third VoIP endpoint.

3. The system of claim 1 wherein the third VoIP endpoint pings landmark devices to determine the location of the third VoIP endpoint and registers the location with a master server for serving as a relay for VoIP communications.

4. The system of claim 3 wherein the first VoIP endpoint pings landmark devices to determine the location of the first VoIP endpoint so that the master server can use that location to estimate the distance between the first VoIP endpoint and the third VoIP endpoint.

5. The system of claim 1 wherein the first VoIP endpoint identifies the third VoIP endpoint by using an IP geo-location database to find a nearby VoIP endpoint having a wired connection to the long-haul link of the network.

6. The system of claim 1 wherein the first VoIP endpoint identifies the third VoIP endpoint by consulting a directory, which instructs the first VoIP endpoint to call the third VoIP endpoint, the directory being external to the first VOIP endpoint.

7. The system of claim 1 wherein the performing of error correcting includes detecting an error in the delivery of a data packet and selecting a replicated data packet that is a duplicate of that data packet to replace that data packet.

8. A computer-readable storage medium that is not a propagating signal storing computer-executable instructions for controlling a first VoIP endpoint that has a wireless link to a network to communicate with a second VoIP endpoint using VoIP technology, the computer-executable instructions comprising instructions for controlling the first VoIP endpoint to:
when a VoIP communication is initiated to communicate with the second VoIP endpoint,
identify a VoIP device to serve as a relay, the VoIP device being a VoIP endpoint and having a microphone and a speaker and capable of inputting via the microphone voice for sending to another VoIP endpoint and outputting via the speaker voice received from another VoIP endpoint;
create data packets of the VoIP communication;
create replicated data for the data packets; and
transmit via the wireless link for delivery to the identified VoIP device the data packets and the replicated data
wherein when the identified VoIP device receives the data packets and the replicated data,
the identified VoIP device performs error correcting using the replicated data;
when the identified VoIP device serves as a relay via a wired connection, the identified VoIP device relays via the wired connection the data packets to the second VoIP endpoint without relaying the replicated data; and
when the identified VoIP device serves as a relay via a wireless connection, the identified VoIP device relays via the wireless connection the data packets and the replicated data to the second VoIP device,
wherein each of the first VoIP endpoint and the second VoIP endpoint has microphone and a speaker and is capable of inputting voice via the microphone and outputting voice via the speaker.

9. The computer-readable storage medium of claim 8 wherein the replicated data includes replicated data packets.

10. The computer-readable storage medium of claim 8 wherein the first VoIP endpoint and the VoIP device are peer VoIP devices.

11. The computer-readable storage medium of claim 8 wherein the VoIP device uses the replicated data to correct for errors in the data packets resulting from transmission of the data packets via the wireless link.

12. The computer-readable storage medium of claim 8 wherein the VoIP device pings landmark devices to determine the location of the VoIP device and registers the location with a master server for serving as a relay.

13. The computer-readable storage medium of claim 12 wherein the computer-executable instructions further include instructions that control the first VoIP endpoint to ping landmark devices to determine the location of the first VoIP endpoint so that the master server can use that location to estimate the distance between the first VoIP endpoint and the VoIP device.

14. The computer-readable storage medium of claim 8 wherein the first VoIP endpoint identifies the VoIP device by using an IP geo-location database to find a nearby VoIP device having a wired connection to a long-haul link of the network.

15. The computer-readable storage medium of claim 8 wherein the first VoIP endpoint identifies the VoIP device by consulting a directory, which instructs the first VoIP endpoint to call the VoIP device, the directory being external to the first VoIP endpoint.

16. A method performed by a VoIP device for serving as a relay for a VoIP endpoint that has a wireless link to a network, the method comprising:
receiving from the VoIP endpoint data packets and replicated data of a VoIP call placed by the VoIP endpoint to the VoIP device, the data packets and the replicated data created by and being transmitted from the VoIP endpoint via the wireless link for delivery to the VoIP device for relaying of the data packets to another VoIP endpoint, the VoIP endpoint having identified the VoIP device to serve as a relay;
determining whether an error occurred in the transmission of the data packets;
upon determining that an error occurred in the transmission of the data packets, performing error correction on the data packets using the replicated data; and
transmitting via the wired connection the data packets without the replicated data for delivery to the other VoIP endpoint via a VoIP call placed by the VoIP device to the other VoIP endpoint;
wherein each of the VoIP endpoint, the other IP endpoint, and the VoIP device has a microphone and a speaker and is capable of inputting voice via the microphone and outputting voice via the speaker.

17. The method of claim 16 further comprising pinging landmark devices to determine the location of the VoIP device and registering the location with a master server wherein the master server uses that location to estimate a distance between the VoIP device and the VoIP endpoint.

18. The method of claim 16 wherein the VoIP endpoint identifies the VoIP device using an IP geo-location database.

19. The method of claim 16 wherein the replicated data includes replicated data packets.

20. The method of claim 16 further comprising controlling the VoIP device to negotiate with the VoIP endpoint to select an error correction scheme used to generate the replicated data.

* * * * *